UNITED STATES PATENT OFFICE.

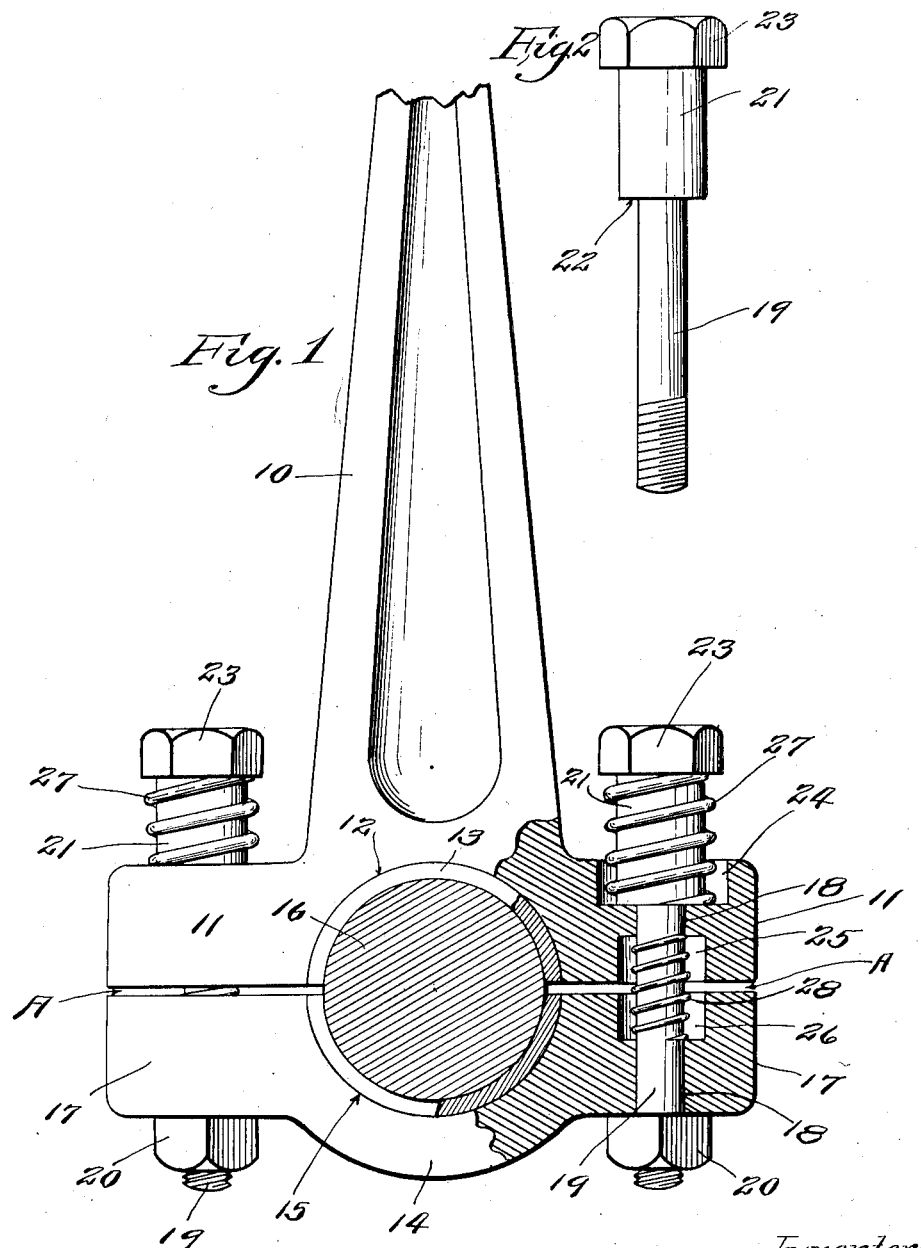

CLARK J. BLANKINSHIP AND WILLIAM M. ELLIS, OF PATOKA, ILLINOIS.

PISTON-ROD JOURNAL-BEARING.

1,338,351.　　　　　Specification of Letters Patent.　　Patented Apr. 27, 1920.

Application filed July 7, 1919. Serial No. 309,090.

*To all whom it may concern:*

Be it known that we, CLARK J. BLANKINSHIP and WILLIAM M. ELLIS, citizens of the United States, residing at Patoka, Illinois, have invented a certain new and useful Improvement in Piston-Rod Journal-Bearings, of which the following is a full, clear, and exact description, such as will enable others skilled in the art to which it appertains to make and use the same, reference being had to the accompanying drawings, forming part of this specification.

Our invention relates generally to piston rods and more particularly to an automatic take-up for the journal bearings of piston rods, the principal objects of our invention being to provide a relatively simple, inexpensive and efficient construction that will automatically take up any wear that may occur between the babbitt lining of the journal bearing and the shaft operating in said bearing, and to accomplish this result we propose to make use of yielding pressure devices such as springs that are arranged to normally draw the cap forming a part of the bearing toward the end of the piston rod.

A further object of our invention is to arrange between the bearing cap and the piston rod, yielding pressure devices, preferably springs, which will be effective in maintaining the cap in proper position with respect to the bearing on the end of the piston rod and which springs will lend to the bearing the desirable feature of flexibility.

With the foregoing and other objects in view, our invention consists in certain novel features of construction and arrangement of parts, hereinafter more fully described and claimed, and illustrated in the accompanying drawings, in which—

Figure 1 is an elevational view of a portion of a piston rod equipped with our improved automatic take-up, parts of said rod and the bearing cap associated therewith being in section.

Fig. 2 is an elevational view of one of the bolts utilized between the parts of the journal bearing.

Referring by numerals to the accompanying drawings, 10 designates a piston rod of the type generally utilized in internal combustion engines, and formed on the lower end of said rod are oppositely disposed ears 11. Formed in the underside of the piston rod between these ears is a semi-circular recess 12 that is provided with a lining 13 of babbitt or analogous material, thus forming the upper half of the journal bearing. A cap 14 is provided with a babbitt lined semi-circular recess 15, the latter coöperating with the babbitt lined recess 12 to form a journal bearing for a crank shaft 16, and the end portions of this cap terminate in ears 17 which are positioned immediately beneath the ears 11.

Formed through the ears 11 are alined apertures 18 adapted to receive the shanks of bolts 19 the latter serving as means for securing the cap in position upon the lower end of the piston rod and the lower ends of said bolts being threaded in order to receive nuts 20. The upper portion 21 of each bolt is larger in diameter than the lower portion, thereby forming a shoulder 22 between the portions 19 and 21 and the upper end of the bolt is provided with a head 23. Formed in the upper portion of each ear 11 around the aperture 18 therethrough is a recess 24, and formed in the underside of each ear 11 around the aperture 18 is a recess 25. Formed in the upper portion of each ear 17 around the aperture therethrough is a recess 26.

Positioned upon the enlarged portion 21 of each bolt is a relatively stiff compression spring 27, the lower end of which rests on the bottom of recess 24 and the upper end bearing against the underside of the bolt head 23. Positioned on each bolt 19 and disposed within the recesses 25 and 26 is a relatively light compression spring 28.

It will be understood that in constructing the journal bearing of the type to which our invention relates, the parts shown be formed so as to provide a slight space A between the ears 11 and 17, such space permitting the cap portion of the bearing to move toward the piston rod as wear occurs on the babbitt lining of the journal bearing.

When our improved bearing is properly assembled, the nuts 20 are tightened on the lower ends of the bolts 19 so as to bring the shoulders 22 on said bolts against the bottoms of the recesses 24 and when so positioned, the relatively heavy springs 27 are placed under considerable tension. Consequently, as wear occurs on the babbitt lining of the journal box, the combined force exerted by springs 27 will act to draw the cap 14 upwardly with the result that a relatively tight bearing is constantly maintained between the babbitt lining of the bearing and the journal of the crank shaft. The relatively light springs 28 are normally under tension and they perform the functions of equalizing springs to maintain the proper space between the upper surfaces of the ears 17 and the undersurfaces of the ears 11 and they also prevent either end of the cap from tilting upwardly as a result of the friction between the crank shaft and the babbitt lining of the journal bearing in said cap.

A journal bearing take-up of our improved construction is comparatively simple, can be easily and cheaply manufactured, is wholly automatic in taking up all wear and lost motion between a shaft and the journal bearing therefor, and imparts to the bearing a relatively high degree of flexibility.

It will be readily understood that minor changes in the size, form and construction of the various parts of our improved device can be made and substituted for those herein shown and described, without departing from the spirit of our invention, the scope of which is set forth in the appended claims.

We claim:

1. The combination with a piston rod, of a cap, there being a journal bearing formed between the said piston rod and cap, bolts passing through parts of the piston rod and said cap, means for securing said bolts in position, compression springs arranged on said bolts and adapted to normally draw the cap toward the piston rod, and relatively light equalizing springs arranged on the bolts between the cap and parts of the piston rod.

2. In combination with a pair of journal bearing members, bolts passing through said members, means on said bolts for securing the same in position, springs located on said bolts and arranged to normally exert pressure tending to draw the parts of the journal bearing toward each other, and means positioned between the journal bearing members for maintaining them in proper spaced apart relation.

3. The combination with a piston rod provided with oppositely arranged ears, of a cap, the end portions of which are arranged adjacent to the ears on the piston rod, there being a journal bearing formed between said cap and piston rod, bolts passing through the ears on the piston rod and the ends of the cap, means for securing said bolts in position, relatively heavy compression springs arranged on said bolts between the heads thereof and the ears on the piston rod, and relatively light compression springs located on the bolts between the ears of the piston rods and the ends of the caps.

4. The combination with a pair of journal bearing members, of bolts passing through said members, means on said bolts for securing same in position, springs located on said bolts and arranged to normally exert pressure tending to draw the parts of the journal bearing toward each other, and relatively light equalizing springs disposed on the bolts between said journal bearing members.

In testimony whereof we hereunto affix our signatures this first day of July, 1919.

CLARK J. BLANKINSHIP.
WILLIAM M. ELLIS.